United States Patent Office 3,401,206
Patented Sept. 10, 1968

3,401,206
PROCESS FOR PRODUCING HIGHER OLEFINS
Horst-Dieter Wulf and Karl Gelfert, Marl, Germany, assignors to Chemische Werke Hüls Aktiengesellschaft, Marl, Germany
No Drawing. Filed June 25, 1964, Ser. No. 378,067
Claims priority, application Germany, Aug. 6, 1963, C 30,631
4 Claims. (Cl. 260—666)

ABSTRACT OF THE DISCLOSURE

In a process for the production of higher primary alcohols by oxo-synthesis of olefins obtained by dehydrochlorinating chlorinated higher paraffin hydrocarbons which contain not substantially in excess of 50 molar percent of monochlorinated hydrocarbon, the steps which comprise subjecting chlorinated higher paraffin hydrocarbons to reflux fractional distillation in a column in the presence of metal catalysts selected from iron and alloys thereof at temperatures between 150 and 500° C., condensing the head product in such a manner that the temperature does not fall appreciably below the boiling point of the olefin produced, thereby drawing off the reaction product from the reaction zone at the boiling temperature, reacting the olefins thus obtained with a mixture of carbon monoxide and hydrogen in the presence of cobalt compound, hydrogenating the addition products thereby obtained in the presence of hydrogenation catalysts to obtain higher primary alcohols.

The present invention relates to the production of higher primary alcohols by oxo-synthesis. More particularly, it relates to the production of higher primary alcohols having six or more carbon atoms by oxo-synthesis of olefins produced by subjecting chlorinated hydrocarbons to fractional distillation in the presence of metallic catalysts.

The higher primary alcohols from about $C_6$ upwards have been put to a wide range of uses such as solvents, diluents, anti-foaming and flotation agents. They are also used in large quantities as esterification components for the production of plasticizing agents for vinyl polymers. The higher members, from $C_{10}$ upwards, are used primarily in the form of esters of sulfuric acid, used as surface-active washing and wetting agents.

A large portion of the technically needed supply of higher alcohols has been produced by hydrogenation of natural fats. For the production of the so-called softening alcohols, use has been made primarily of the aldol conversion of butyraldehyde followed by crotonization and hydrogenation to produce the alcohol, or the "oxo-synthesis" combination of carbon monoxide with olefins in the presence of cobalt carbonyl followed by hydrogenation of the initially produced aldehyde to form the alcohol. The olefins used for the "oxo-synthesis" are derived mainly from the cracking of paraffinic waxes, or are produced by di- or trimerization of butylenes or propylenes. The olefins produced by the cracking of paraffinic waxes have the advantage over those produced by polymerization in that the former are straight-chain compounds which makes them suitable for a wider variety of uses, but they also have the great economic disadvantage in that their production is always accompanied by the formation of olefins of higher or lower molecular weights in considerable amounts, and for which there is a lesser demand. It has therefore been highly desirable that a practical method should be found for producing olefins from paraffins and paraffin mixtures which can be isolated from mineral oil fractions, e.g. by "molecular screening," to a high degree of purity and with a high proportion of n-paraffins and suitable for the oxo-synthesis of primary alcohols.

Saturated hydrocarbons have previously been chlorinated and olefins produced therefrom by the splitting away of hydrogen chloride. For example, according to U.S. Patent No. 2,708,210, chlorinated paraffinic hydrocarbons were heated for several hours at 250° C. in the presence of a pretreated cracking catalyst of the montmorillonite type. Hydrogen chloride was liberated and olefins having an iodine number up to 92% of the theoretical and a residual chlorine content up to 0.16% were thereby produced.

The U.S. Patent 1,384,447 suggests the use of metals such as iron, zinc or aluminum in powdered form, or the corresponding metal oxides as catalysts for dehydrochloridizing the chlorinated hydrocarbons, but mentions that the last portions of hydrogen chloride are held in unusually stable combinations. The persistence of a few tenths of a percent of residual chlorine after the known dehydrochloridizing treatment renders the olefins thus produced useless for oxo-synthesis because the halogen present poisons the catalyst required for hydrogenation of the olefins to primary alcohols.

According to the present invention, it has now been discovered that higher primary alcohols can be produced satisfactorily by oxo-synthesis from olefins obtained by dehydrochloridizing chlorinated paraffinic hydrocarbons without the previous disadvantages set out above, provided the chlorinated hydrocarbons are previously subjected to fractional distillation at temperatures between 150 and 500° C., and preferably between 180 and 350° C. in the presence of metallic catalysts. The olefins liberated during this operation are condensed, and reacted with carbon monoxide and hydrogen in the presence of cobalt compounds. The addition product resulting from this reaction is separated from the cobalt compounds, and hydrogenated to primary alcohols in the presence of a hydrogenation catalyst.

Suitable dehydrochloridizing catalysts include metals and metal alloys, singly or in mixtures, selected from Groups Ib, II($a+b$), IIIa, Va, VIa and VIII of the Periodic Table. Iron has been found to be especially suitable.

The process has been found to be particularly adapted to the use of the products of partial chlorination of n-paraffins. Use, however, can also be satisfactorily made of branched chain or cyclo-aliphatic hydrocarbons or aromatics which carry normal paraffinic, iso- or cyclo-paraffinic side chains. In producing the chlorinated product it is advisable to continue the chlorination only long enough to produce a maximum of 50% molar conversion into monochlorinated hydrocarbons. In which case, the subsequent dehydrochloridizing can be preceded by a separation of the chlorinated from the non-chlorinated hydrocarbons, although it is possible to dehydrochloridize without effecting this separation.

The dehydrochloridizing is performed e.g. by introducing the chlorinated hydrocarbons, or mixtures thereof, with any corresponding hydrocarbons into a fractionating column, which serves as the reaction chamber, containing a dehydrochloridizing metal catalyst heated to the desired reaction temperature. The fractionating column is operated as a reflux in such a manner that the chlorinated hydrocarbons remain in the reaction space until they have been split into olefin and hydrogen chloride. The condensation of the head product is performed in such a manner that the temperature does not fall appreciably below the boiling point of the olefin produced, so that the reaction product can be drawn off from the reaction zone at the boiling temperature. The separation of the liberated hydrogen chloride can be advantageously effected in a gas-separating column or in a gas cooler. The pressure under which the reaction is performed is selected so that the boiling point of the resulting olefin remains within the reaction temperature range of 150–500° C.

The resulting olefins, or mixtures thereof, with the corresponding hydrocarbons are caused to react under known conditions with carbon monoxide and hydrogen in the presence of cobalt compounds.

The primary alcohols produced by the method of this invention are especially suitable for preventing foam production and also for use as a lacquer solvent. In the range of from 6 to 9 C-atoms, if esterified with phthalic, adipic or sebacic acid, they produce low temperature plasticizers for polyvinyl chloride.

The corresponding primary alcohols of the 10 to 18 C-atom range can be converted into esters of sulfuric acid by sulfating with chlorsulfonic acid followed by neutralization with sodium hydroxide. Such esters have excellent washing and wetting properties and are completely decomposed by biological means.

The following examples are given for the purpose of illustrating the invention but it should be understood that the invention is not specifically limited thereto as various modifications of the procedures shown will be obvious to one skilled in the art and such modifications which fall within the concept of the present invention are intended to be covered by the appended claims.

Example 1

Chlorinated paraffins of the $C_8$ to $C_9$ range, with a chlorine content of 9.64% by weight and corresponding to a 36.5% molar paraffin chlorination, were introduced at the rate of 8 kg. per hour into a reflux column filled with 15 x 15 mm. iron Raschig rings and 150 mm. in diameter and 3.20 m. in height. The material was added to a height of 1 m. above the sump of the column which was heated by a circulating vaporizer. Using an operating pressure of 4.5 atm., the sump of the column was warmed to 280° C. With a head temperature of 202° C. and three-stage reflux, there was an hourly distillation of a mixture of 1905 g. olefin and 5240 g. $C_8$ to $C_9$ paraffins. The condensation was effected in a tubular condenser cooled by n-decan under normal pressure and from which the olefin-paraffin mixture was drawn off at boiling temperature. The liberated hydrogen chloride was drawn off from the condenser, and from this hydrogen chloride the olefin-paraffin mixture, dependent on the pressure, was condensed out in a gas cooler and returned to the reflux column. From the sump of the column 63 g. of higher condensed residues were drawn off per hour. The olefin-paraffin mixture had a residual chlorine content of about 0.001%.

Into a 20 l. autoclave a solution of 0.4 kg. of cobalt compound in 3 l. of benzene was plcaed. After raising the temperature of the contents of the autoclave to 150° C. a mixture of carbon monoxide and hydrogen in the ratio of 4.5 to 5.5 was introduced. After 1.5 hours the contents of the autoclave were cooled and 8 kg. of the $C_8$ to $C_9$ olefin-paraffin mixture, prepared as above described, and containing an olefin content of 26.7%, was introduced into the autoclave and the contents maintained for a period of three hours at a temperature of 180° C. and at a pressure of 300 atmospheres by the addition of carbon monoxide and hydrogen.

After cooling, 3 l. water were introduced and the mixture was then de-cobaltized for one hour at 170° C. under 300 atm. hydrogen pressure. The reaction product was separated from water, the benzene removed by distillation and the benzene-free residue additionally hydrogenated for two hours at 200° C. under 300 atm. with a nickel contact catalyst, whereby the carbonyl number was reduced to 0.1. The reaction mixture was then fractionated by distillation, whereby 5850 g. of $C_8$ to $C_9$ paraffin were recovered. The yield amounted to 1620 g.=76% of the theoretical yield based on a mixture of primary nonyl- and decyl-alcohols, which distill at 98 to 101° C. under 12 torr pressure, and a higher boiling residue.

Example 2

A mixture of $C_{12}$ and $C_{13}$ paraffins having a molecular weight of 179 was chlorinated to a chlorine content of 6.2% by weight, corresponding to 33.5% molar. 2000 kg. of this partially chlorinated paraffin were fed per hour into the head of a Raschig column of 800 mm. diameter filled with 4.4 m. of 35 x 35 mm. iron Rachig rings and heated at its sump to 295° C. by circulating steam. The mixture of olefins, paraffins, hydrogen chloride, and eventually some non-reacted chlorinated alkanes was delivered to a 40 plate bubble column of 1000 mm., diameter where it was subjected to fractional distillation, whereby the enriched chlorinated alkanes in the sump of the column, which is similarly heated by circulating steam were returned to the Raschig-column. The vapors leaving the head of the bubble-tray column at 255° C. and 1 atm. pressure were condensed in a steam boiler in which steam was generated at 20 atm. pressure. A portion of the condensate was drawn off at boiling temperature from the steam boiler used as a condenser, while the remainder was returned to the bubble tray column. From the condenser there was an hourly production of about 78 Nm.$^3$ hydrogen chloride which was cooled to 20° C. in a gas cooler. The olefin-paraffin mixture thereby separated was returned to the bubble-tray column. An hourly yield of a mixture of 420 kg. olefin and 1342 kg. of $C_{12}$ and $C_{13}$ paraffins with a residual chlorine content of 12 p.p.m. was obtained.

10.5 kg. of high-boiling components were withdrawn hourly from the sump of the Raschig column. During the reaction the Raschig rings became coated with a thin layer of $FeCl_2$ and carbon, thereby causing a slight increase in the catalytic action.

8 kg. of the olefin-paraffin mixture obtained as above described were introduced into an autoclave containing 3 l. of benzene and 0.4 kg. of a cobalt compound which had previously been treated at 150° C. with a mixture of carbon monoxide and hydrogen in the ratio of 4.5 to 5.5. The resulting mixture was subjected to the action of a mixture of carbon monoxide and hydrogen at 160° C. and under 300 atmos. pressure for a period of three hours. Three liters of water were then introduced and the mixture de-cobaltized for 1 hour at 170° C. and under 300 atm. hydrogen gas pressure. After distilling off the benzene, the reaction mixture still had a carbonyl number of 0.2 so that a subsequent hydrogenation was not necessary.

By fractional distillation of the reaction product, 5770 g. of paraffin were recovered which could be returned for another chlorination and dehydrochloridizing treatment. The yield was 2070 g., corresponding to 78.5% of the theoretical, of primary tridecanols and tetradecanols having a boiling point of 144 to 149° C. at 10 mm. pressure. By reaction with chlorosulfonic acid and subsequent addition of soda lye the sodium salt of the alcohol sulfate was obtained. These sulfonates had excellent washing and wetting properties and complete biological decomposability.

Example 3

Cyclododecane was chlorinated in the liquid phase at 120° C. to a chlorine content at 5.9%.

452 g. of this partially chlorinated cyclododecane were introduced per hour into a column of 50 mm. diameter and 3 m. length, filled with 4 x 4 mm. webbed Raschig rings. The material was added to a height of one meter above the sump electrically heated to 285° C. At the head of the column 420 g. of a mixture of 120 g. of cyclododecene and 300 g. of cyclododecane with a chlorine content of 7 p.p.m. was removed over a dephlegmator at 242° C. and under normal pressure. From the sump of the column after 65 hours of reaction time, 260 g. higher boiling components were removed. From the spherical cooler above the dephlegmator, 27 g. HCl escaped per hour and were absorbed by water.

400 g. of the above mixture of cyclododecane and cyclododecene were introduced into a 1 l. autoclave containing a solution of 20 g. of a cobalt compound in 150 ml. benzene previously treated for 2 hours at 150° C. and under 300 atmos. pressure with a gaseous mixture of 4.5 parts of CO and 5.5 parts hydrogen. The reaction was terminated after 4 hours at 160° C. After cooling, the autoclave was depressurized. 200 ml. of water introduced, and after one hour at 170° C. and under 300 atm. of hydrogen pressure the cobalt carbonyl was decomposed. By distillation 302 g. cyclododecane B.P.$_{10}$ 106° C. and 101 g. oxymethyl-cyclododecane, B.P.$_{.1}$ 125 to 128° C., corresponding to an 86% yield, were obtained.

While the preparation of only a limited number of higher alcohols has been shown in the specific example, it is to be understood that the process is equally applicable to the production of any higher primary higher alcohol containing six or more carbon atoms.

What is claimed is:

1. A one-step process for the production of olefins having low residual chlorine concentrations, said process comprising the step of:
   (A) dehydrochlorinating a solution consisting essentially of higher paraffinic hydrocarbons and not more than about 50 percent based on the total mols in solution of monochlorinated higher paraffinic hydrocarbon, said dehydrochlorinating comprising the steps of:
      (1) subjecting said solution to reflux fractional distillation and simultaneous chemical reaction at 150–500° C. in the presence of a metallic iron catalyst; and
      (2) condensing resultant overhead olefin-paraffin mixture in indirect heat exchange with a coolant under such conditions that the temperature of the condensate is withdrawn at substantially the boiling temperature thereof; the resultant olefin-paraffin mixture having a residual chlorine content on the order of about 10 p.p.m.

2. A process as defined by claim 1, wherein said chlorinated paraffins are $C_8$ to $C_9$ and said coolant is n-decane at atmospheric pressure.

3. A process as defined by claim 1, wherein said chlorinated paraffins are $C_{12}$ to $C_{13}$ and said coolant is water at 20 atmospheres.

4. A process as defined by claim 1, wherein said chlorinated paraffin is cyclododecane, and condensation is conducted at about 242° C.

References Cited

UNITED STATES PATENTS

| | | | |
|---|---|---|---|
| 1,384,447 | 7/1921 | Gardner et al. | 260—677 |
| 2,065,323 | 12/1936 | Wayne et al. | 260—677 |
| 2,490,973 | 12/1947 | Leonard et al. | 260—677 |
| 2,734,923 | 2/1956 | Cohen et al. | 260—617 |
| 3,055,942 | 9/1962 | Roming | 260—638 |
| 3,247,277 | 4/1966 | Kruse et al. | 260—677 |
| 2,779,802 | 1/1957 | Harlan | 260—638 |
| 2,854,475 | 9/1958 | Hoog et al. | 260—638 |
| 3,014,970 | 12/1961 | Johnson et al. | 260—638 |
| 3,095,451 | 6/1963 | Roelen et al. | 260—617 |
| 3,239,569 | 3/1966 | Slaugh et al. | 260—617 |

FOREIGN PATENTS

| | | |
|---|---|---|
| 886,455 | 8/1953 | Germany. |
| 1,094,758 | 12/1954 | France. |
| 80,357 | 8/1955 | Netherlands. |

LEON ZITVER, *Primary Examiner.*

J. E. EVANS, *Assistant Examiner.*